United States Patent
Kacevas et al.

(10) Patent No.: US 7,058,795 B2
(45) Date of Patent: Jun. 6, 2006

(54) METHOD AND APPARATUS OF BRANCH PREDICTION

(75) Inventors: Nicolas Kacevas, Haifa (IL); Eran Altshuler, Haifa (IL)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 10/178,555

(22) Filed: Jun. 25, 2002

(65) Prior Publication Data

US 2003/0236969 A1    Dec. 25, 2003

(51) Int. Cl.
*G06F 9/38* (2006.01)

(52) U.S. Cl. .......................... 712/239; 712/23
(58) Field of Classification Search ............... 712/239, 712/240, 237, 238, 23
See application file for complete search history.

(56) References Cited

U.S. PATENT DOCUMENTS

| | | | | |
|---|---|---|---|---|
| 5,687,360 A | * | 11/1997 | Chang | 712/240 |
| 5,781,789 A | * | 7/1998 | Narayan | 712/23 |
| 5,828,874 A | * | 10/1998 | Steely et al. | 712/240 |
| 6,640,327 B1 | * | 10/2003 | Hallberg | 714/785 |

* cited by examiner

*Primary Examiner*—Henry W. H. Tsai
(74) *Attorney, Agent, or Firm*—Pearl Cohen Zedek Latzer, LLP

(57) ABSTRACT

Briefly, a method and apparatus of branch prediction is provided. The branch prediction may be done by performing a XOR operation between MSB of set bits of a path register with LSB of set bits of an instruction pointer address register to provide a global index, and by performing a XOR operation of LSB tag bits of the path register with MSB tag bits of the instruction pointer address register and providing a tag index. There may be multiplexing between a global prediction to a local prediction.

13 Claims, 3 Drawing Sheets

METHOD AND APPARATUS OF BRANCH PREDICTION

BACKGROUND OF THE INVENTION

Computer designs may attempt to execute as many instructions as possible concurrently. To find enough instructions to keep busy, the processors in the computers may use a branch prediction unit (BPU) to guess which instructions will be executed. The branch prediction unit may include a path register, which may be known in the art as a stew register, a global predictor, a local predictor and the like. However, some components of the BPU such as for example, the stew register and/or connections between the components such as for example, the connection between the global predictor and the local predictor may include critical paths. The critical paths may limit the work frequency of the processor that contains the BPU.

Thus, there is a need for better ways to provide branch predictions that mitigate the above disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
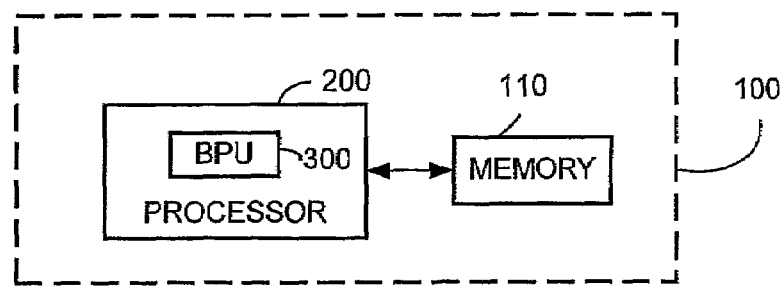
FIG. 1 is a block diagram of an apparatus according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in variety of applications. Although the present invention is not limited in this respect, the circuits and techniques disclosed herein may be used in many apparatuses such as for example processors, microprocessors, digital signal processors and the like.

Turning first to FIG. 1, an apparatus 100 according to some embodiments of the present invention is shown. The apparatus 100 may comprise a memory 110 and a processor 200. Although the scope of the present invention is not limited in this respect, processor 200 may include a branch prediction unit (BPU) 300. For example, apparatus 100 may be, for example, a processor mother board or the like. In addition, memory 110 may be, for example, dynamic read access memory (DRAM), a read only memory (ROM), a Flash memory, Static RAM (SRAM) and the like. Memory 110 may be used to read and write processor 200 instructions, if desired. Furthermore, processor 200 may be, for example, a reduced instruction set computer (RISC), a processor that has a pipeline, a complex instruction set computer (CISC) and the like.

Although the scope of the present invention is not limited to this embodiment, in operation, instructions from memory 110 may be inputted to processor 200. As known to one skilled in the art, processor 200 may fetch the instructions from memory 110, decode the instructions and execute the instructions. Furthermore, some instructions may be branch instructions and BPU 300 may predict the occurrences of branch instructions.

Figure 2:
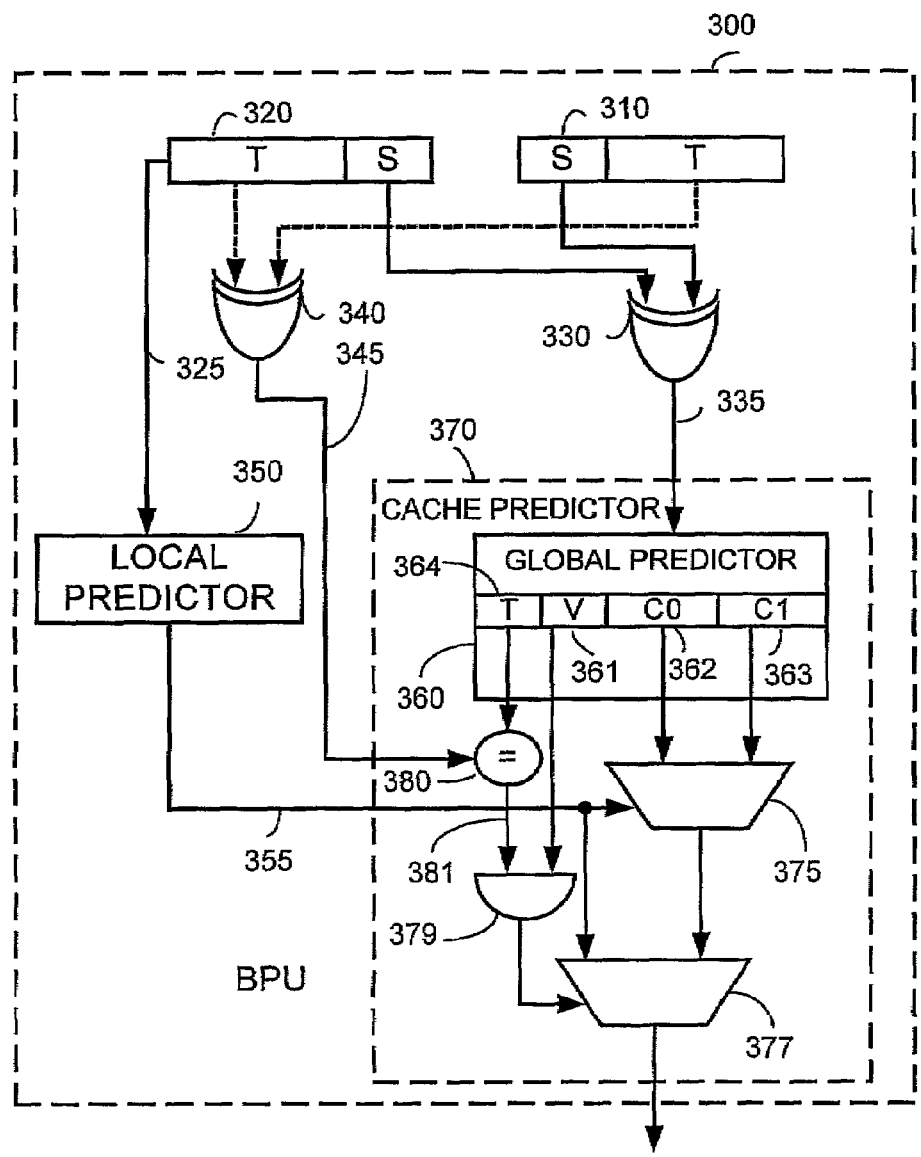
FIG. 2 is a block diagram of a branch prediction unit according to an embodiment of the present invention.

Turning now to FIG. 2, BPU 300 according to an embodiment of the present invention is shown. Although the scope of the present invention is not limited in this respect, BPU 300 may include a path information register 310, an instruction pointer (IP) address register 320, a XOR gate 330, a XOR gate 340, a cache predictor unit 370 and a local predictor 350. Furthermore, cache predictor unit 370 may include a global predictor 360, a multiplexer 375 a multiplexer 377, an AND gate 379 and a comparator 380, if desired. Although the scope of the present invention is not limited in this respect, path register 310 may be included in a stew register (not shown).

Although the scope of the present invention is not limited in this respect, the contents of path register 310 and IP address register 320 may be used to provide set bits and tag bits to XOR gate 330 and XOR gate 340, respectively. Although the scope of the present invention is not limited in this respect, cache predictor 370 may include a plurality of global predictor entries. The set bits may be used to set an entry in cache predictor 370 and the tag bits may be compared to the bits of the entry that is set by the set bits. More particularly, XOR gate 330 may receive most significant bits (MSB) of set bits (S) from path register 310 and least significant bits (LSB) of set bits (S) from IP address register 320. In addition, as indicated by dashed lines in FIG. 2, XOR gate 340 may receive MSB of tag bits (T) from IP address register 320 and LSB of tag bits (T) from path register 310. Furthermore, IP address register 320 may provide IP address information 325 to local predictor 350.

It should be understood that in alternative embodiments of the present invention (not shown), XOR gate 330 may receive MSB of set bits (S) from the IP address register and LSB of set bits (S) from the path register, XOR gate 340 may receive MSB of tag bits (T) from the path register and LSB of tag bits (T) from the IP address register, and path register 310 may provide path information (not shown) to local predictor 350.

Returning to FIG. 2, although the scope of the present invention is in no way limited to this embodiment, XOR gate 340 may perform a bitwise operation of XOR and may provide tag information to cache predictor 370. Although the scope of the present invention is not limited in this respect, local predictor 350 may use information local to a branch instruction to predict the execution of a branch instruction. Recognizing a pattern in history branch executions may do the prediction. The IP address information may be used to address history branch addresses in local predictor 350.

Although the scope of the present invention is not limited in this respect, XOR gate 330 may perform a bitwise operation of XOR and may provide a global index 335 to global predictor 360. Although the scope of the present invention is in no way limited to this embodiment, global predictor 360 may be, for example, a set of associative cache memories and an entry to one of the associative cache memory may include a tag index 364, a valid bit 361, a counter 362 (C0) and a counter 363 (C1). Comparator 380 may compare tag index 364 to tag bits 345 produced by XOR 340 and may generate a global hit/miss signal 381. Furthermore, counters 362 and 363 may be for example, final state machine (FSM) counters. In addition, counters 362 and 363 may represent the prediction for that particular entry. The prediction of counters 362 and 362 may be dependent on local predictor 350 predictions which may be taken and not taken. Although the scope of the present invention is not limited in this respect, counters 362 and 363 may be, for example, Lee and Smith counters, if desired.

In addition, multiplexer 375 may receive a first global prediction from counter 363 and a second global prediction from counter 362. A local prediction 355 may be used to select between the prediction received from counter 362 to the prediction received from counter 363. Furthermore, multiplexer 377 may receive the local prediction 355 and the selected prediction from multiplexer 375. Valid bit 361, that may indicate the validity of global predictor 360, may be provided by AND gate 379 and may be used to select between the global prediction to the local prediction 355. For example, "0" may be use to select the local prediction 355 and "1" may be used to select the global prediction. Furthermore, AND gate 379 may provide "0" if the global prediction is not valid or if the hit/miss signal is "0". AND gate 379 may provide "1" if the global prediction is valid and hit/miss signal 381 is "1".

Figure 3:
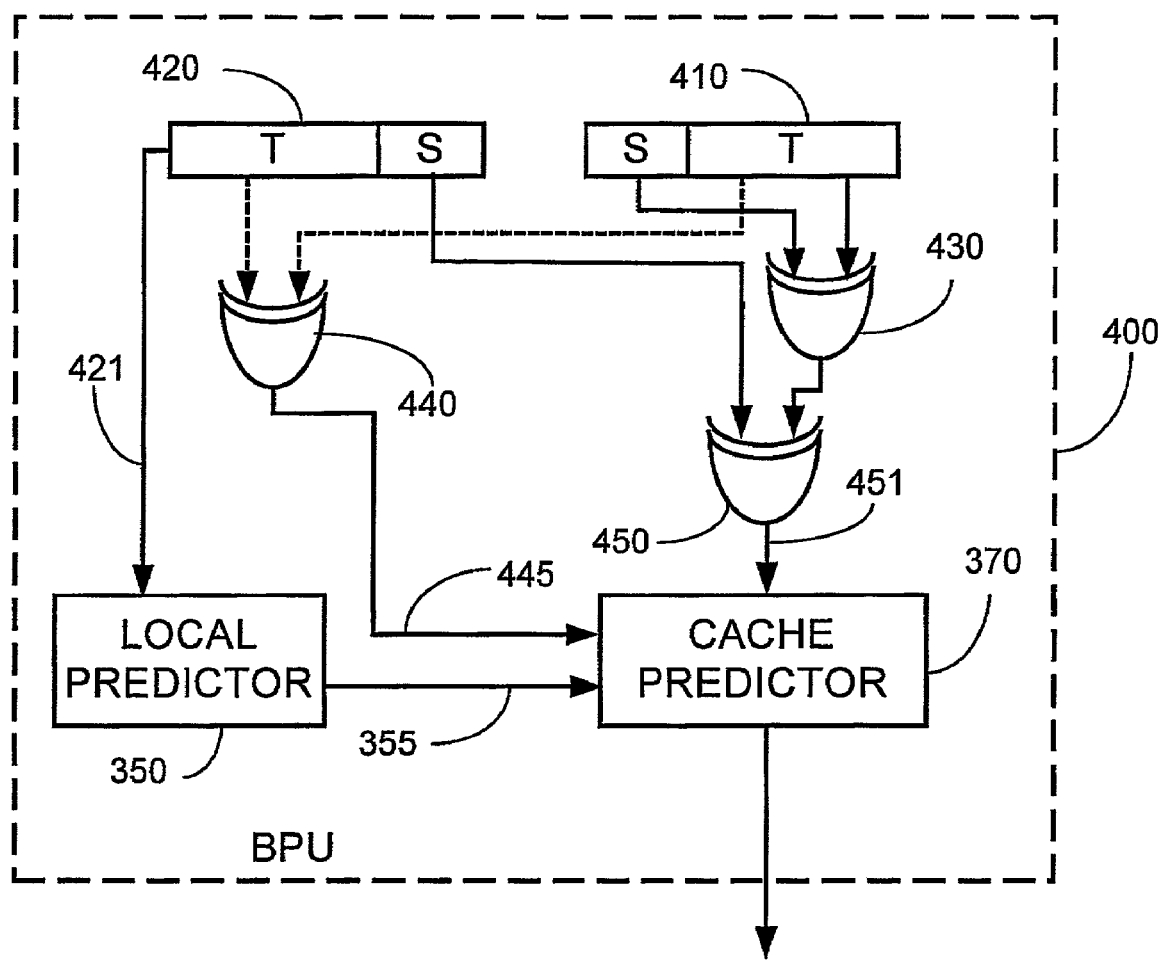
FIG. 3 is a block diagram of a branch prediction unit according to an alternative embodiment of the present invention.

Turning now to FIG. 3, a block diagram of a BPU 400 according to an alternative embodiment of the present invention is shown. For simplicity and for clarity of the description only the differences between BPU 300 and BPU 400 will be described, although the scope of the present invention is in no way limited in this respect. In this example of the alternative embodiment of the present invention, BPU 400 may include a path information register 410, an IP address register 420, a XOR gate 430, a XOR gate 440, a XOR gate 450, the cache predictor unit 370 and the local predictor 350.

Although the scope of the present invention is not limited in this respect, the content of path register 410 may be used to provide set bits to XOR gate 430. XOR gate 430 may perform a bitwise XOR operation between MSB and LSB of path register 410. IP address register 420 may be used to provide tag bits and set bits to XOR gate 440 and XOR gate 450, respectively. More particularly, as indicated by dashed lines in FIG. 3, XOR gate 440 may receive LSB of tag bits (T) from path register 410 and MSB of tag bits (T) from IP address register 420. In addition, XOR gate 450 may receive MSB of set bits (S) from XOR gate 430 and LSB of set bits from IP address register 420.

Furthermore, IP address register 420 may provide a local index 421 to local predictor 350, and XOR gate 450 may provide a global index 451 to cache predictor 370. In addition, XOR gate 440 may provide a tag index 445 to cache predictor 370, and local predictor may provide a local prediction 355 to cache predictor 370. However, it should be understood that in alternative embodiments of the present invention (not shown), the content of IP address register 420 may be used to provide set bits to XOR gate 430 and the content of path register 410 may be used to provide MSB tag bits to XOR gate 440.

Figure 4:
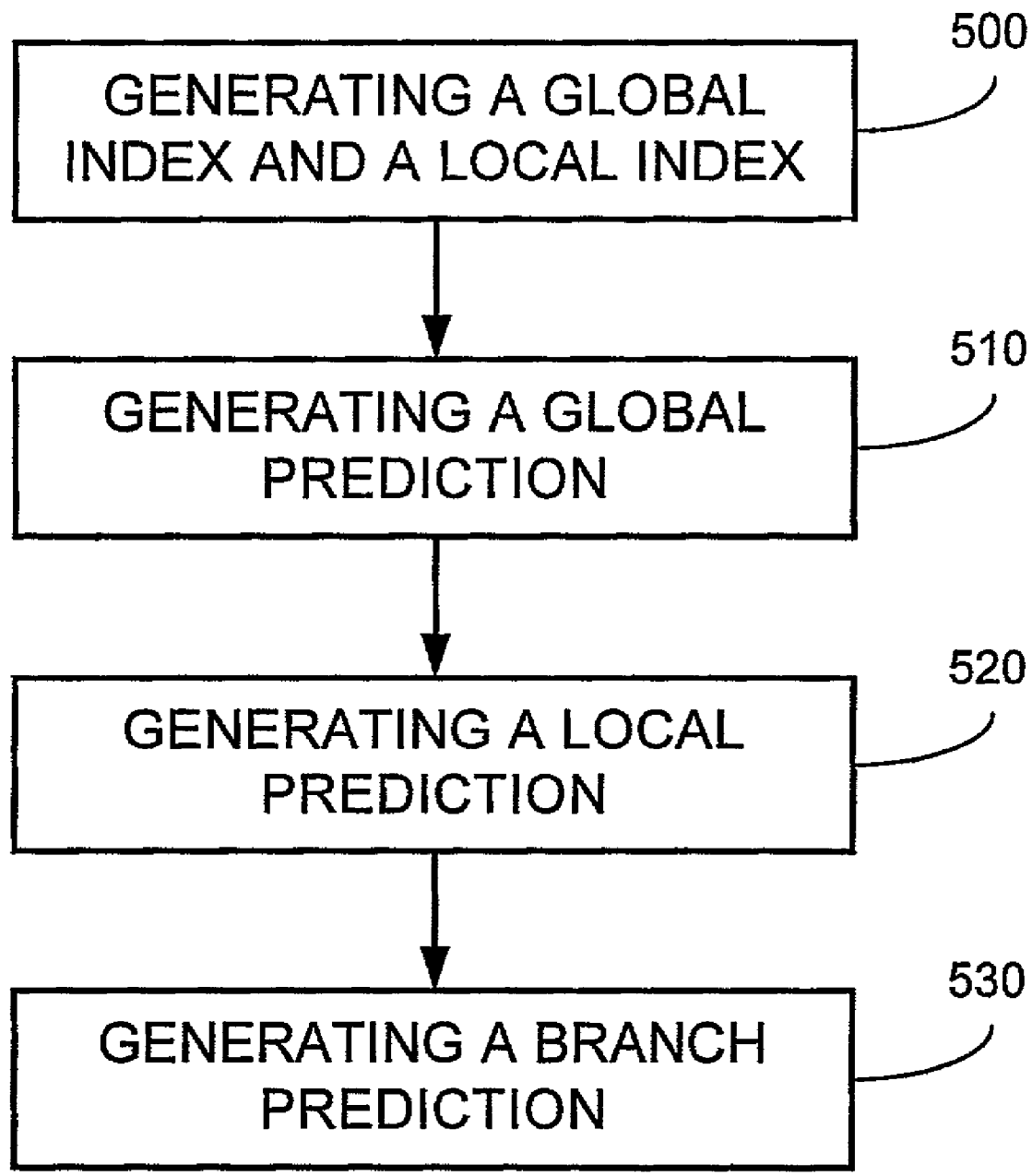
FIG. 4 is a flowchart of a method according to an embodiment of the present invention.

Turning to FIG. 4, a flow chart of a method of branch prediction according to some embodiments of the present invention is shown. Although the scope of the present invention is not limited in this respect, the method may begin with generating a local index and a global index (block 500). For example, the generation of the global index may be done by performing a bitwise XOR operation between LSB of index pointer address register 320 and MSB of path information register 310 to provide set bits of the global index and by performing a bitwise XOR operation between LSB of path register 310 and MSB of index pointer address register 320 to provide the tag bits of the global index. The method may proceed with generating a global prediction (block 510). For example, global predictor 360 may receive the global index and generate the global prediction. A detailed description of generating the global prediction was provided with the description of FIG. 2 above. The method may proceed with generating a local prediction 355 (block 520). For example, local predictor 350 may receive the local index and generates the local prediction 355. A detailed description of generating the local prediction was provided with the description of FIG. 2 above. The method may proceed with generating a branch prediction (block 530). For example, the branch prediction may be done by multiplexing between global predictions provided by counters 362, 363 of the global predictor 360 according to the local prediction 355 and further multiplexing between tile global prediction provided by above multiplexing to the local prediction 355 according to the validity of the global prediction that may be provided, for example, by valid bit 361.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
   a first XOR gate to perform a XOR operation of most significant bits (MSB) of set bits of a path register with least significant bits (LSB) of set bits of an instruction pointer address register to provide a first index to a cache predictor; and a second XOR gate to perform a XOR operation of LSB of tag bits of the path register with MSB of tag bits of the instruction pointer address register to provide a second index to said cache predictor.

2. The apparatus of claim 1, wherein said cache predictor comprises:
a global predictor to receive the first index and to provide first and second global branch predictions;
a comparator to compare the second index with tag bits of an entry selected by the first index; and
a first multiplexer to receive the first and second global branch predictions and a local branch prediction and to provide a first combined prediction.

3. The apparatus of claim 2, wherein said cache predictor comprises:
a second multiplexer to receive the first combined prediction, the local branch prediction and a global hit/miss signal from the comparator, wherein the second multiplexer is able to provide a second combined prediction according to the validity of the first and second global branch predictions.

4. The apparatus of claim 1 comprising a branch prediction unit.

5. The apparatus of claim 1, wherein the first XOR gate comprises:
two XOR gates wherein one XOR of the two XOR gates is able to perform a XOR operation of most significant bits (MSB) of set bits of a path register with least significant bits (LSB) of set bits of the pat register to provide set bits index; and
a second XOR gate of the two XOR gates is able to perform a XOR operation of set bits index of a path register with least significant bits (LSB) of set bits of the instruction pointer register.

6. An apparatus comprising:
a processor comprising a branch prediction unit to predict branch instructions; and
a dynamic RAM to provide instructions to the processor, wherein the branch prediction unit comprises:
a first XOR gate to perform a XOR operation of most significant bits (MSB) of set bits of a path register with least significant bits (LSB) of set bits of an instruction pointer address register to provide a first index; and
a second XOR gate to perform a XOR operation of LSB of tag bits of the path register with MSB of tag bits of the instruction pointer address register to provide a second index.

7. The apparatus of claim 6, wherein the branch prediction unit further comprises:
a global predictor to receive the first index and to provide a first and second global branch predictions;
a comparator to compare the second index with tag bits of an entry selected by the first index;
a local predictor to provide a local branch prediction; and
a first multiplexer to receive the first and second global branch predictions and the local branch prediction and to provide a first combined prediction.

8. The apparatus of claim 7, further comprising:
a second multiplexer to receive the first combined global branch prediction, the local branch prediction and a global hit/miss signal from the comparator, wherein the second multiplexer is able to provide a second combined prediction according to the validity of the first and second global predictions.

9. The apparatus of claim 6, wherein the set bits of the instruction pointer address register comprises most significant bits (MSB).

10. A method comprising:
performing a XOR operation of most significant bits (MSB) of set bits of a path register with least significant bits (LSB) of set bits of an instruction pointer address register to provide a first index to a cache predictor; and
performing a XOR operation of LSB of tag bits of the path register with MSB of tag bits of the instruction pointer address register to provide a second index to said cache predictor.

11. The method of claim 10, comprising:
providing first and second global branch predictions according to the first index;
comparing the second index with tag bits of an entry selected by the first index; and
multiplexing first and second global branch predictions and a local branch prediction and to provide a first combined prediction.

12. The method of claim 11, comprising
multiplexing the first combined prediction, the local branch prediction and a global hit/miss signal to provide a second combined prediction according to the validity of the first and second global branch predictions.

13. The method of claim 10 comprising:
predicting a branch command by multiplexing a local prediction with a global prediction.

* * * * *